(12) United States Patent
Boshra

(10) Patent No.: US 8,275,178 B2
(45) Date of Patent: Sep. 25, 2012

(54) SOFTWARE BASED METHOD FOR FINGER SPOOF DETECTION AND RELATED DEVICES

(75) Inventor: Michael Boshra, Indialantic, FL (US)

(73) Assignee: Authentec, Inc., Melbourne, FL (US)

( * ) Notice: Subject to any disclaimer, the term of this patent is extended or adjusted under 35 U.S.C. 154(b) by 674 days.

(21) Appl. No.: 12/486,978

(22) Filed: Jun. 18, 2009

(65) Prior Publication Data

US 2009/0316963 A1  Dec. 24, 2009

Related U.S. Application Data

(60) Provisional application No. 61/074,069, filed on Jun. 19, 2008.

(51) Int. Cl.
*G06K 9/00* (2006.01)
(52) U.S. Cl. ...................................... 382/124
(58) Field of Classification Search .............. 382/124
See application file for complete search history.

(56) References Cited

U.S. PATENT DOCUMENTS

| | | | |
|---|---|---|---|
| 5,719,950 A | 2/1998 | Osten et al. | 382/115 |
| 5,953,441 A | 9/1999 | Setlak | 382/124 |
| 5,963,679 A | 10/1999 | Setlak | 382/312 |
| 6,292,576 B1 | 9/2001 | Brownlee | 382/124 |
| 6,795,569 B1 | 9/2004 | Setlak | 382/124 |
| 7,054,470 B2 | 5/2006 | Bolle et al. | 382/124 |
| 7,505,613 B2 | 3/2009 | Russo | 382/124 |
| 2002/0131624 A1 | 9/2002 | Shapiro et al. | 382/124 |
| 2003/0044051 A1 | 3/2003 | Fujieda | 382/124 |
| 2003/0169910 A1* | 9/2003 | Reisman et al. | 382/124 |
| 2005/0089203 A1 | 4/2005 | Setlak | 382/124 |
| 2005/0117785 A1 | 6/2005 | Boshra | 382/124 |
| 2005/0129291 A1 | 6/2005 | Boshra | 382/124 |
| 2006/0062438 A1 | 3/2006 | Rowe | 382/124 |
| 2007/0014443 A1 | 1/2007 | Russo | 382/124 |
| 2007/0230754 A1 | 10/2007 | Jain et al. | 382/125 |
| 2008/0025580 A1 | 1/2008 | Sidlauskas et al. | 382/124 |
| 2008/0049987 A1 | 2/2008 | Champagne et al. | 382/124 |
| 2008/0232653 A1 | 9/2008 | Rowe | 382/124 |
| 2008/0253625 A1 | 10/2008 | Schuckers et al. | 382/125 |
| 2008/0298648 A1* | 12/2008 | Lo et al. | 382/125 |
| 2009/0060296 A1 | 3/2009 | Mainguet | 382/124 |

OTHER PUBLICATIONS

Chen et al., Fingerprint Deformation for Spoof Detection, Biometric Symposium, Crystal City, Virginia, 2005.*
Abhyankar et al., Fingerprint Liveness Detection Using Local Ridge Frequencies and Multiresolution Texture Analysis Techniques, Proc. Int. Conf. Image Processing, 2006.

(Continued)

*Primary Examiner* — Bhavesh Mehta
*Assistant Examiner* — Nirav G Patel
(74) *Attorney, Agent, or Firm* — Allen, Dyer, Doppelt, Milbrath & Gilchrist, P.A.

(57) ABSTRACT

A finger sensor may include a finger sensing area and a controller cooperating with the finger sensing area for storing enrollment data including finger feature locations. The controller may be for generating authentication data including finger feature locations based upon positioning of an object adjacent the finger sensing area. The controller may also be for performing aligning the authentication data and the enrollment data, matching between the aligned enrollment and authentication data, and spoof attempt detecting based upon corresponding pairs of finger features and their spatial locations in the aligned enrollment and authentication data. The controller may further be for performing an authentication decision based upon the matching and spoof detecting.

36 Claims, 4 Drawing Sheets

OTHER PUBLICATIONS

Jain et al., On-line Fingerprint Verification, IEEE Trans. Pattern Analysis Machine Intelligence, vol. 19, No. 4, pp. 302-314, 1997.
Chen et al., Fingerprint Deformation for Spoof Detection, Biometric Symposium, Cristal City, Virginia, 2005.
Antonelli et al., Fake Finger Detection by Skin Distortion Analysis, IEEE Trans. Info. Forensics and Security, vol. 1, No. 3, 2006.
Derakhshani et al., Determination of Vitality from a Non-Invasive Biomedical Measurement for Use in Fingerprint Scanners, Pattern Recognition, vol. 36, No. 2, 2003.
"Fake Finger Detection", Biometric System Laboratory, DEIS-University of Bologna, 2005.

* cited by examiner

SOFTWARE BASED METHOD FOR FINGER SPOOF DETECTION AND RELATED DEVICES

RELATED APPLICATIONS

The present application is based on provisional application Ser. No. 61/074,069, filed Jun. 19, 2008, the entire contents of which are incorporated by reference.

FIELD OF THE INVENTION

The present invention relates to the field of electronics, and, more particularly, to the field of finger sensing devices, and associated manufacturing methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,963,679 to Setlak et al. and assigned to the assignee of the present invention. The fingerprint sensor is an integrated circuit sensor that drives the user's finger with an electric field signal and senses the electric field with an array of electric field sensing pixels on the integrated circuit substrate. Such sensors are used to control access for many different types of electronic devices such as computers, cell phones, personal digital assistants (PDA's), and the like. In particular, fingerprint sensors are used because they may have a small footprint, are relatively easy for a user to use and they provide reasonable authentication capabilities.

U.S. Published Patent Application No. 2005/0089203 also to Setlak, assigned to the assignee of the present invention, and the entire contents of which are incorporated herein by reference. This application discloses an integrated circuit biometric sensor that may sense multiple biometrics of the user, and that is also adapted to either a static placement sensor or a slide finger sensor. The images collected may be used for matching, such as for authentication, or may be used for navigation, for example. The multiple biometrics, in addition to enhancing matching accuracy, may also be used to provide greater resistance to spoofing.

Another significant advance in finger sensing technology is disclosed in U.S. Pat. No. 5,953,441 also to Setlak et al., assigned to the assignee of the present invention, and the entire contents of which are incorporated by reference. This patent discloses a fingerprint sensor including an array of impedance sensing elements for generating signals related to an object positioned adjacent thereto, and a spoof reducing circuit for determining whether or not an impedance of the object positioned adjacent the array of impedance sensing elements corresponds to a live finger to thereby reduce spoofing of the fingerprint sensor by an object other than a live finger. A spoofing may be indicated and/or used to block further processing. The spoof reducing circuit may detect a complex impedance having a phase angle in a range of about 10 to 60 degrees corresponding to a live finger. The fingerprint sensor may include a drive circuit for driving the array of impedance sensing elements, and a synchronous demodulator for synchronously demodulating signals from the array of impedance sensing elements. The spoof reducing circuit may operate the synchronous demodulator at least one predetermined phase rotation angle. The spoof reducing circuit may cooperate with the synchronous demodulator for synchronously demodulating signals at first and second phase angles and generating an amplitude ratio thereof, and may also compare the amplitude ratio to a predetermined threshold.

"Spoof" fingerprints are typically made using natural and artificial materials, such as gelatin, gum, gummy bears, meat products, clay, Play-Doh, auto body filler, resins, metal, etc. that can be used to imitate the ridges and valleys present in a real fingerprint. As it is desirable to be able to acquire a fingerprint image under any skin condition (dry, moist, etc.) some fingerprint sensors employ real-time gain and other adjustments to obtain the best possible images. In doing so, sensors that detect fingerprints using these approaches are sometimes susceptible to attack using spoofs because these systems are capable of imaging widely varying skin conditions (and other materials).

Spoof detection approaches can be broadly classified into hardware and software based approaches. Hardware based approaches typically involve coupling a biometric device to a finger sensor. For example, previous work in the area of spoof detection and reduction may be considered as having used: A.) impedance classification: determining the impedance characteristics of a material over some frequency range; B.) optical dispersion characteristics; C.) thermal measurements; D.) phase setting and signal amplitude; and E.) finger settling detection. In contrast, a software based approach to spoof detection may not involve changes or additions to a finger sensor. A software based approach may involve additional comparisons of finger samples from a user.

Derakhshani et al., Determination of Vitality from a Non-Invasive Biomedical Measurement for Use in Fingerprint Scanners, *Pattern Recognition*, Vol. 36, No. 2, 2003, discloses a spoof detection method that uses a temporal perspiration approach. Such an approach may result in a dynamic moisture pattern along the ridges of the user's finger. A signal corresponding to this moisture pattern is obtained by locating ridges in a given image. Features are extracted from ridge signals in a pair of images obtained five seconds apart. Those features are used for classification by aid of a neural network.

Antonelli et al., Fake Finger Detection by Skin Distortion Analysis, *IEEE Trans. Info. Forensics and Security*, Vol. 1, No. 3, 2006, discloses using differences in elasticity between the real and fake fingers for spoof detection. A user places his finger on a finger sensor and rotates it while exerting pressure to exaggerate finger deformation. A video sequence of fingerprint images is acquired while the user is rotating the finger. Distortion is estimated by calculating a non-rigid motion field between each pair of consecutive fingerprint images. Distortion information is grouped within a set of concentric rings to form a "distortion code." The "distortion code" is compared with a reference distortion code (for a real finger) to classify the given finger as real or fake. The reference distortion code may be either universal or different for each user.

Chen et al., Fingerprint Deformation for Spoof Detection, *Biometric Symposium*, Cristal City, Va., 2005, also discloses using an elasticity disparity between real and fake fingers. Chen et al. discloses aligning enrollment and authentication images using minutiae, and calculating the relative non-linear distortion using a thin-plate spline (TPS). Deformation features, reduced through principal components analysis (PCA) are used for classification based on a support vector machine (SVM).

Abhyankar et al., Fingerprint Liveness Detection Using Local Ridge Frequencies and Multiresolution Texture Analysis Techniques, *Proc. Int. Conf. Image Processing*, 2006, discloses adopting statistical features obtained through multi-resolution texture and local-ridge frequency analysis. Classification is performed using a fuzzy c-means classifier. U.S. Pat. No. 7,505,613 to Russo discloses a method of finger spoof detection that is similar to Abhyankar et al., but adds user adaptability.

SUMMARY OF THE INVENTION

In view of the foregoing background, it is therefore an object of the present invention to provide a method of enhanced spoof reduction and related devices.

This and other objects, features, and advantages in accordance with the present invention are provided by a finger sensor that may include a finger sensing area and a controller cooperating with the finger sensing area for storing enrollment data including finger feature locations. The controller may be for generating authentication data including finger feature locations based upon positioning of an object adjacent the finger sensing area. The controller may also be for performing aligning the authentication data and the enrollment data, matching between the aligned enrollment and authentication data, and spoof attempt detecting based upon corresponding pairs of finger features and their spatial locations in the aligned enrollment and authentication data. The controller may further be for performing an authentication decision based upon the matching and spoof detecting. Accordingly, the finger sensor device provides enhanced spoof reduction.

The controller may perform the spoof attempt detecting based upon at least one of spatial deformation distortion, relative error between corresponding finger features, and noise distortion. The controller may also perform the spoof attempt detecting based upon non-linear deformation between corresponding enrollment and authentication finger features, for example.

The enrollment and authentication finger features may include at least one of ridge-orientation angles, minutiae, and pores. The controller may also perform the aligning between corresponding enrollment and authentication finger features.

The controller may generate a match score based upon performing the matching and the controller may perform the spoof attempt detecting based upon the match score. The match score may be based upon auxiliary alignment data, for example. The auxiliary alignment data may include at least one of size of overlapping region, data quality, and content, for example. The controller may be for comparing the match score to a threshold for performing the spoof attempt detecting operation. The threshold may be set based on a quality metric of the enrollment data, for example.

The controller may perform spoof attempt detecting based upon auxiliary alignment data. The auxiliary alignment data may include at least one of size of overlapping region, data quality, and content, for example.

The controller may also be for generating a ratio of spoof likelihood based upon at least one of spatial deformation distortion, relative error between corresponding finger features, and noise distortion, for example. Determining the spoof attempt may be based upon the ratio, for example. The controller may include a memory cooperating with the finger sensing area for storing the enrollment data.

Another aspect is directed to a method of determining a spoof attempt in a finger sensor device. The finger sensor device may include a finger sensing area and a controller cooperating with the finger sensing area for storing enrollment data and generating authentication data based upon positioning of an object adjacent the finger sensing area, for example. The method may include using the controller for performing aligning the authentication data and the enrollment data, and matching between the aligned authentication data and enrollment data. The controller may also be for performing spoof attempt detecting based upon corresponding pairs of finger features and their spatial locations in the aligned enrollment and authentication data, and an authentication decision based upon the matching and spoof attempt detecting, for example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
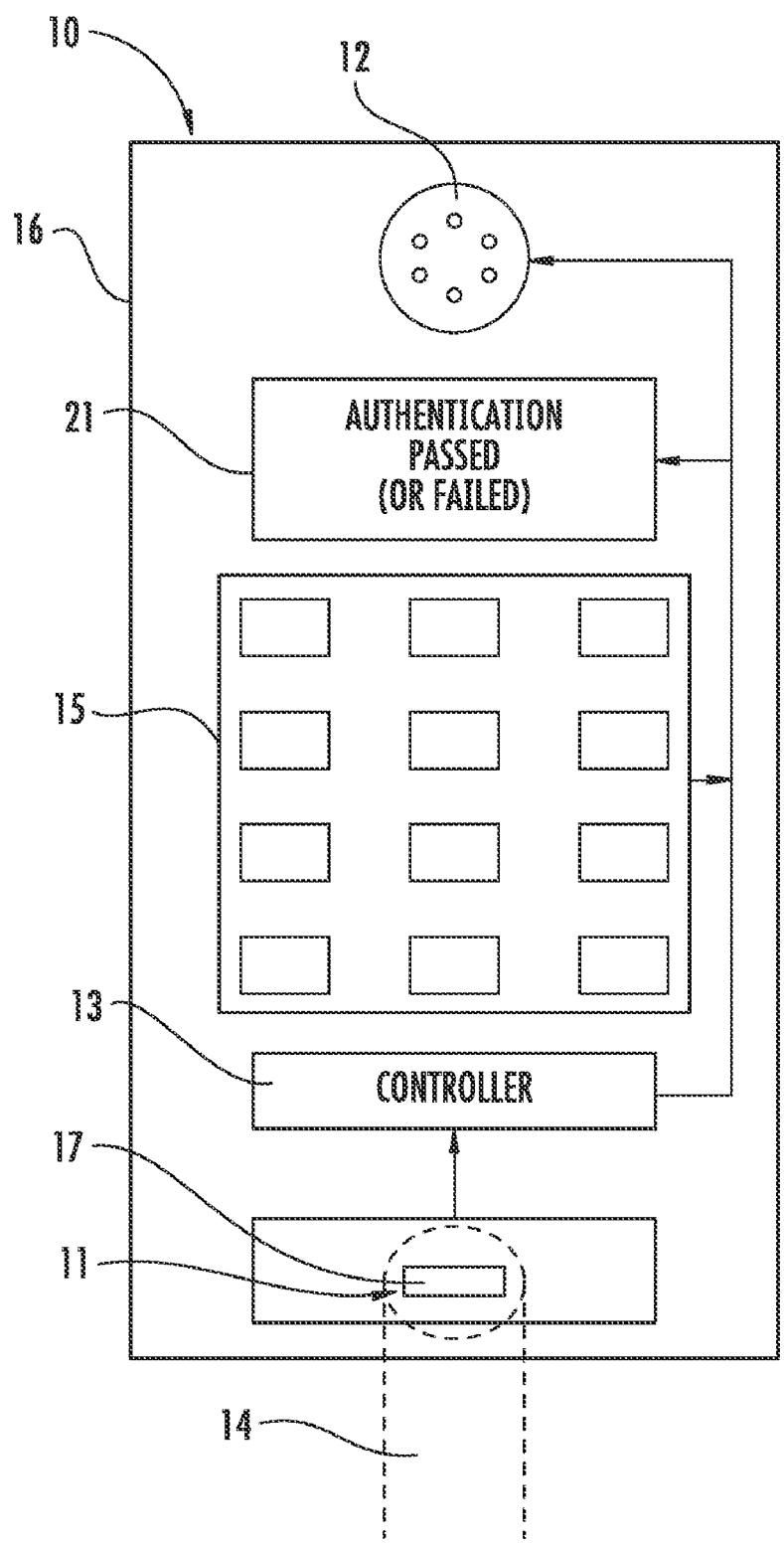
FIG. 1 is a schematic block diagram of an electronic device in accordance with the invention.
Figure 2:
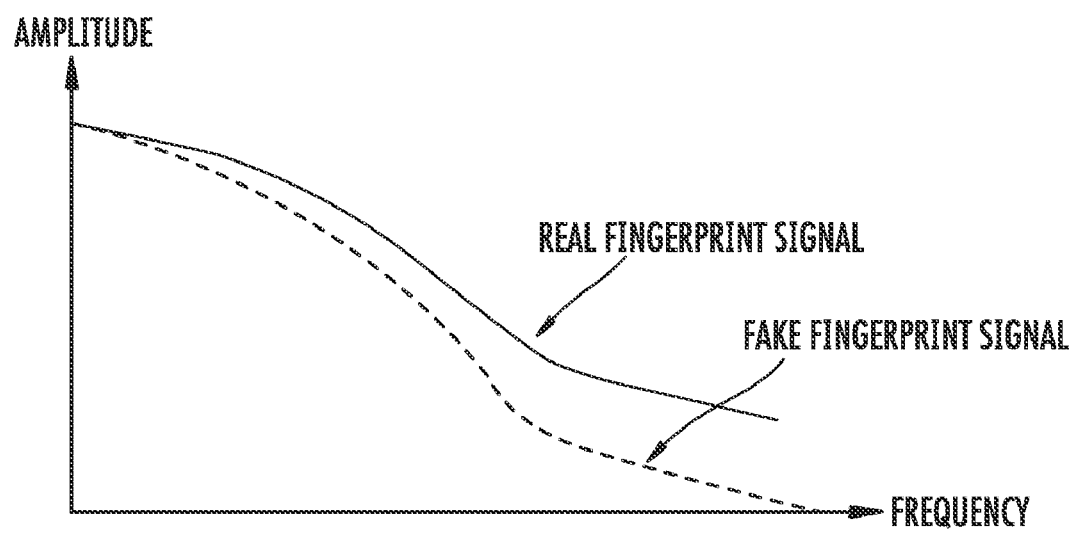
FIG. 2 is a graph of a frequency spectrum of a noise-free fingerprint signal for real and fake fingerprints.

Referring initially to FIGS. 1 and 2, spoof fingers generate data that is generally more "distorted" than real finger data. For example, generating a spoof finger may be done by first lifting a latent fingerprint of a user of interest, and then using the latent fingerprint to create a three-dimensional mold of the user's finger. The mold can be made of materials such as gelatin or play-dough, for example. In another example, the mold can be made from the user's finger itself through coercion. As will be appreciated by those having ordinary skill in the art, fake or spoof fingerprint data is generated by going through more processes than for real data, for example, in latent image generation and fake finger construction scenarios.

Each process in generating the fake fingerprint data introduces distortion to the data. Accordingly, fake data typically is more distorted relative to corresponding real data. Even the process of placement of the sensor, though generally the same for all scenarios, may introduce more distortion in the fake-finger case, due to the disparity in elasticity between real and fake fingers. This is especially true when using a slide sensor, such as, for example, an AuthenTec 2810 slide sensor, available from AuthenTec, Inc. of Melbourne, Fla., the assignee of the present application.

Several types of distortion include noise, resolution-based feature attenuation, and spatial deformation. Regarding noise, fake fingerprint data is likely to have increased noise content. Regarding resolution-based feature attenuation, fingerprint features are likely to be more attenuated/removed depending on associated resolutions, as illustrated in the graph of FIG. 2, for example. The attenuation process may conceptually be used as applying a low-pass filter to real fingerprint data. For example, pores are more likely to be missed compared to minutiae since they are much smaller. Regarding spatial deformation, fake data is likely to be more spatially deformed, for example, stretched and/or compressed relative to the real data.

Existing approaches are limited in that they attempt to capture only a subset of the above-mentioned distortion types. For example, the methods presented in Antonelli et al. and Chen et al. only consider spatial deformation, whereas those in Abhyankar et al. and Russo implicitly target noise and resolution-based feature attenuation.

Referring more particularly to FIG. 1, an electronic device 10 illustratively includes a portable, handheld housing 16, that carries a display and controller 13 coupled to the display. The electronic device 10 also includes a display 21 coupled to the controller. The electronic device 10 also includes an audio output transducer 12 coupled to the controller 13, also carried by the housing 16. The electronic device 10 is illustratively in the form of a mobile telephone. The electronic device 10 may be in the form of other mobile wireless communications devices, such as a personal digital assistant (PDA), or laptop computer, for example, may be used.

The electronic device 10 also illustratively includes a finger sensor 11 carried by the housing 16 and coupled to the controller 13. The finger sensor 11 may be a slide sensor, and illustratively includes a finger sensing area 17. The controller 13 is illustratively in a separate component from the finger sensor 11, such as incorporated in the host processor of the device. In some embodiments, the controller 13 may be integrally formed with the finger sensor 11, for example, as a single integrated circuit. Of course in other embodiments the controller 13 may be implemented by circuitry within the finger sensor 11, as well as the host processor as will be appreciated by those skilled in the art.

Figure 3:
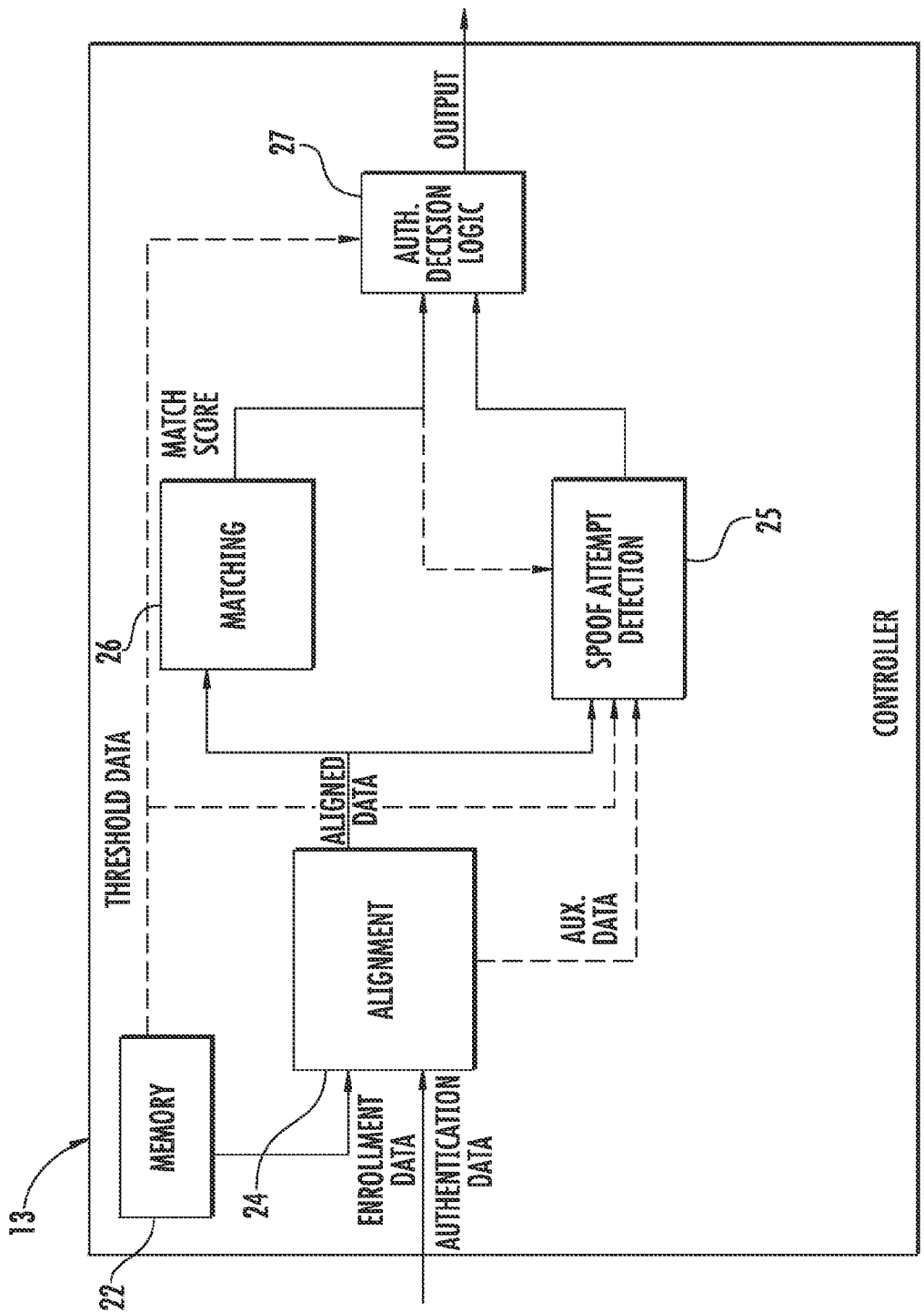
FIG. 3 is a schematic block diagram of the controller of the electronic device of FIG. 1.

Referring now additionally to FIG. 3, the controller 13 cooperates with the finger sensing area 17 for storing enrollment data in a memory 22. The memory 22 may be included in the controller 13 or may be a shared memory being shared with the electronic device 10, as will be appreciated by those skilled in the art.

The enrollment data may include finger feature locations. Finger feature locations may include, for example, locations of pore density, moisture, ridge pixel values, and minutae. The enrollment data may also include locations of at least one biometric characteristic of a user's finger 14. Of course, locations of other finger features may be collected as enrollment data, as will be appreciated by those skilled in the art.

The controller 13 also generates authentication data that includes the finger feature locations. The authentication data finger feature locations are based upon positioning of an object, for example, the user's finger 14, adjacent the finger sensing area 17. In other words, the authentication data finger feature locations may be based upon extracted raw fingerprint data. Of course, those skilled in the art would appreciate that the object may be a spoof finger or other object that imitates the user's finger.

The controller 13 also aligns the authentication data and the enrollment data at the alignment block 24. Alignment of the authentication and enrollment can be performed using any of existing alignment techniques typically used for matching. For example, such alignment methods may include those disclosed by M. Boshra, Methods For Matching Ridge Orientation Characteristic Maps and Associated Finger Biometric Sensor, U.S. Published Patent Application No. 2005/0117785; and A. K. Jain et al., On-line Fingerprint Verification, *IEEE Trans. Pattern Analysis Machine Intelligence*, Vol. 19, No. 4, pp. 302-314, 1997, both of which are herein incorporated by reference. The aligned data output by the alignment block 24 includes a list of corresponding enrollment and authentication data features, or matches. As will be appreciated by those skilled in the art, the list or corresponding enrollment and authentication data features may have "null matches" when a given feature does not have a corresponding one.

The alignment process considers rigid and non-rigid transformation between the authentication and enrollment data. For example, a rigid transformation may include a global rotation and 2-D translation, as will be appreciated by those skilled in the art.

The aligned data, or corresponding enrollment and authentication data, from the alignment block 24 are illustratively provided to the spoof attempt detection block 25. At the spoof attempt detection block 25, spoof attempt detecting may be based upon the corresponding pairs of finger features and their spatial locations in the aligned enrollment and authentication data. Detecting a spoof attempt includes analyzing relative distortion by comparing corresponding enrollment and authentication features. For example, a spoof attempt may be determined based upon spatial deformation, relative error between corresponding finger features, noise distortion, or a combination of any of the three. Of course, spoof detection may be based on other metrics, as will be appreciated by those skilled in the art. Based upon the comparison of the corresponding enrollment and authentication features, a decision is made at the spoof attempt detection block 25 as to whether the relative distortion is more likely to have arisen from a real finger or a fake one.

In addition to the corresponding enrollment and authentication data, from the alignment block 24, auxiliary alignment data may be provided to the spoof attempt detection block 25. Auxiliary alignment data may include a size of an overlapping region, data quality and content, and other data, for example.

The relative distortion analysis performed at the spoof detection block 25 may be performed in several ways. For example, in one embodiment, relative distortion analysis may involve extraction of relative-distortion measurements, such as the relative error between corresponding feature values. For example, in another embodiment where a ridge-orientation matcher is used, the relative error may be a difference between corresponding enrollment and authentication ridge-orientation angles. The relative error may be described, for example, by calculating the standard deviation of the error and percentage of outliers.

Where features of various resolutions are being matched, for example, minutiae and pores, the relative error statistics may be additionally collected for other types of features. Typically, the error statistics are calculated as a function of feature resolution.

In another embodiment, the relative distortion measurements may be extracted by analyzing the extent and nature of the relative non-linear deformation that each enrollment and/or authentication feature undergoes in the alignment process at the alignment block 24. For example, the non-linear deformation can be described by a 2-D translation that differs from one feature to the other. This transformation, which is in addition to the global rigid transformation, can be viewed as a multivariate function that is typically small in value and smoothly varying across fingerprint data. One example measure of the extent of non-linear deformation is average magnitude of the non-rigid transformation, as will be appreciated by those skilled in the art.

Statistics of the relative distortion measures, for example, error and non-linear deformation, for real and fake matches, are gathered at the spoof attempt detection block 25. A classifier (not shown), for example, as disclosed in R. O. Dude et al., Pattern Classification, Wiley-Interscience, New York, 2000, the entire contents of which are herein incorporated by reference, may be included at the spoof attempt detection block 25. The classifier may be based upon the gathered statistics and may be for determining whether the sensed user finger 14 is a real or fake (i.e. spoof) match. In some embodiments, the classifier may be tailored to the statistics of each user, for example. In other embodiments, the classifier may also be global, as will be appreciated by those skilled in the art. The classifier may be based upon other features and may be selected from the auxiliary data, for example. Indeed, the spoof-detection performed at the spoof attempt detection block 25 is advantageously transparent, for example, no additional effort would be exerted by the user, user-adaptive, and spatially-sensitive.

In another embodiment, the relative distortion analysis may be performed by comparing corresponding enrollment and authentication features, pair-by-pair, and calculating the likelihood that the relative distortion is arising from a real and fake match. A ratio of the likelihood may be used to decide whether the authentication data is real or fake.

The aligned data, or corresponding enrollment and authentication data, are also illustratively provided to the matching block 26. At the matching block 26 the aligned data, along with the auxiliary data is analyzed and a match score is generated. Indeed, as will be appreciated by those skilled in the art, the auxiliary data may affect the match score.

A match score is generally inversely proportional to the amount of relative distortion between enrollment and authentication data. Accordingly, a real-match score, in other words, a match score generated from a real finger and not a spoof, is generally expected to be higher than a fake-match score. For example, a ridge-orientation matcher, as described in M. Boshra, Methods For Matching Ridge Orientation Characteristic Maps and Associated Finger Biometric Sensor, U.S. Published Patent Application No. 2005/0117785, may be used, and since the match score is proportional to the overlapping area, the mean match score (per unit area) may be more discriminating than the raw match score. Moreover, since the mean match score is proportional to the data content, a more discriminating feature can be obtained by normalizing the mean score with respect to the data content. Calculating the normalized mean match score can be done, for example, by subtracting the average of mean scores for the given data content from the given mean score.

The match score may also represent a "distance" instead of a "score." In other words, the match score may represent a number that is directly proportional to the extent of relative distortion between enrollment and authentication data.

As will be recognized by those skilled in the art, the normalized mean match score may be used along with other features for classification of a real/fake finger match. For example, other features that may be used at the matching block 26 to generate the match score may include the relative-distortion measures, described above, and/or hardware-based features.

In some embodiments, the analysis used for authentication and generating the match score at the matching block 26 may be the same analysis used at the spoof attempt detection block 25 for spoof detection, as described above. In other embodiments, however, different analysis may be performed, for example, a minutia matcher for same/different finger classification and a pattern matcher for real/fake finger classification may be used, for example. Also, a combination of different analysis (matchers) may be performed for each type of classification (i.e. match score generation/authentication and spoof attempt detection/real-fake finger).

Additionally, the match score provided by the matching block 26 may be optionally provided to the spoof attempt detection block 25. The match score may be used at the spoof attempt detection block 25 to supplement the statistics of the relative distortion measures, and any auxiliary data gathered therein. The classifier may also be additionally based upon the match score to further determine a real or fake finger.

The match score from the matching block 26 and the real/fake decision from the spoof attempt detection block 25 are provided to the authentication decision logic 27. Based upon the match score and the real/fake determination, an authentication decision is performed, The result or output of the authentication decision may be displayed on the display 21.

As will be appreciated by those skilled in the art, the authentication decision logic 27 may include a classifier for determining and outputting a final authentication decision. Indeed, having a final authentication decision based upon both spoof attempt detection and a match score advantageously may increase accuracy and speed of the finger sensing. Moreover, the present embodiments provide transparency, user adaptability, and spatial sensitivity, all of which are not based upon a closed set of finger features.

Additionally, the received match score may be compared to a threshold for determining a match. The threshold may be set a default value and stored in the memory 11. Additionally, the threshold may be dynamically set based upon the measurements being used in the match analysis. For example, the threshold may be determined based upon a quality metric of the enrollment data, which is stored in the memory 11. The match score may also be compared to a threshold in the spoof attempt detection block 25. A spoof attempt determination may be based upon the match score exceeding the threshold. As will be appreciated by those skilled in the art, the match score threshold used in determining a spoof attempt may be set to a different threshold value than the threshold for determining the authentication decision.

Figure 4:
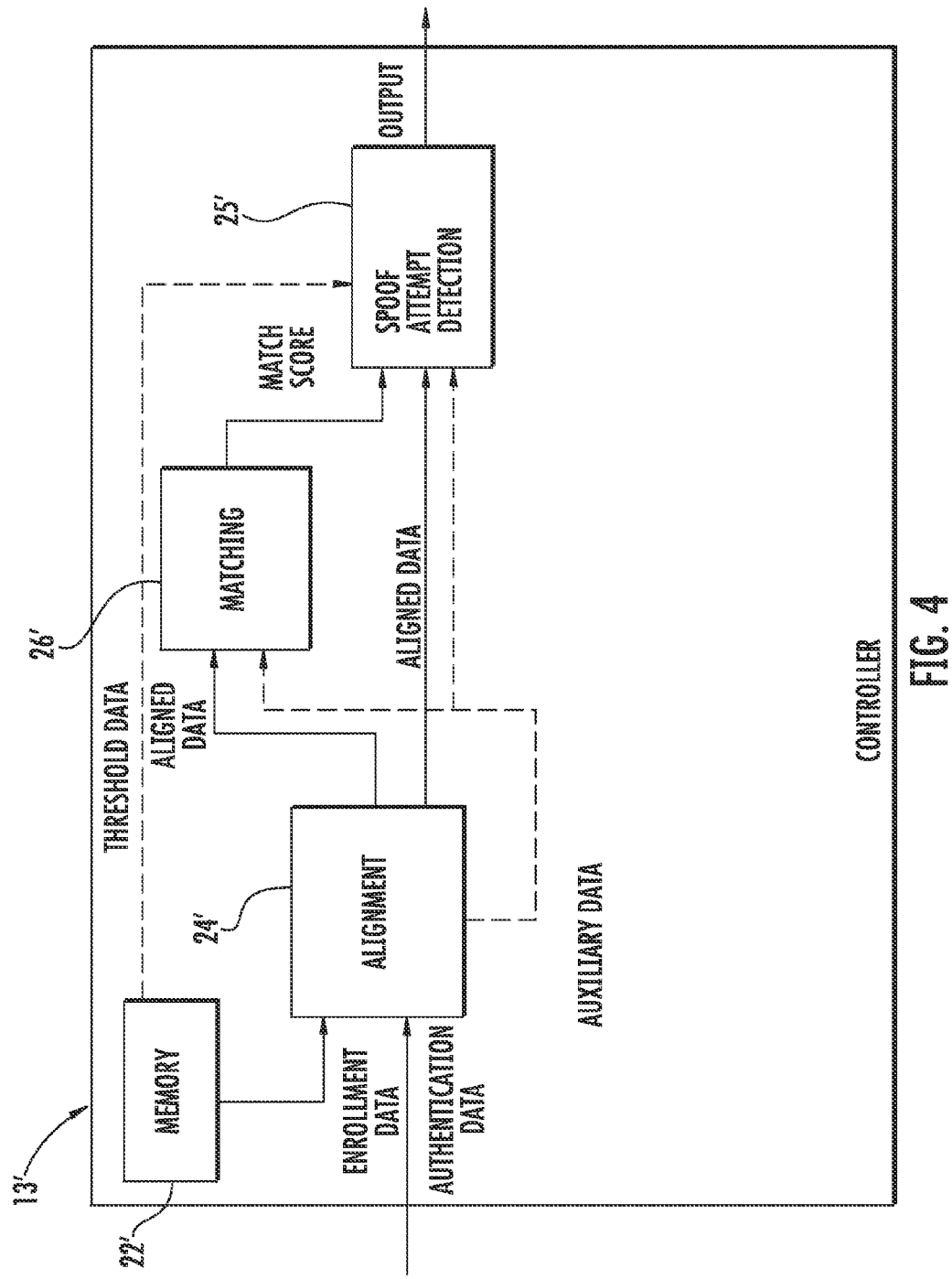
FIG. 4 is a schematic block diagram of another embodiment of the controller of the electronic device of FIG. 1.

Turning now to FIG. 4, another embodiment of the controller 13' is illustrated. Illustratively, the aligned data, or corresponding enrollment and authentication data, are illustratively first provided to the matching block 26'. Auxiliary data, as described above, may optionally be provided to the matching block 26' and/or the spoof attempt detection block 25'. The match score is output from the matching block and received along with the aligned data at the spoof attempt detection block 25'. Advantageously, spoof attempt detection at the spoof attempt detection block 25' is based upon the match score and the aligned data. Based upon the match score and the aligned data, a spoof attempt detection analysis is performed at the spoof attempt detection block 25' using the above-noted analysis methods. Illustratively, the output of the spoof attempt detection block 25' is the authentication decision. As will be appreciated by those skilled in the art, authentication decision logic is not provided in the embodiment illustrated in FIG. 4, as the aligned data is analyzed and processed serially to arrive at the authentication decision.

Referring again to FIGS. 1 and 3, another aspect is directed to a method of determining a spoof attempt in a sensor device 10. The sensor device 10 includes a finger sensing area 17 and a controller 13 cooperating with the finger sensing area for storing enrollment data and generating authentication data based upon positioning of an object adjacent the finger sensing area, for example, a user's finger 14. The method includes using the controller 13 for performing aligning the authentication data and the enrollment data.

The method also includes using the controller 13 for performing a matching operation between the aligned authentication data and enrollment data. The matching operation may generate a match score, for example. The method further includes using the controller 13 for performing a spoof attempt detecting operation between the aligned authentication and enrollment data based upon relative distortion therebetween. The match score may be used in the spoof attempt detecting. Auxiliary data and/or threshold data may also be used in performing the matching and spoof detection. In some embodiments, the controller 13 may include authentication decision logic 27 for making a final authentication decision based upon the matching and spoof detection. In other embodiments, the spoof attempt detecting may be based upon the match score and make the final authentication decision.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger sensor device comprising:
a finger sensing area; and
a controller cooperating with said finger sensing area for storing enrollment data including finger feature locations and generating authentication data including finger feature locations based upon positioning of an object adjacent said finger sensing area;
said controller also for performing
aligning the authentication data and the enrollment data,
matching between the aligned enrollment and authentication data,
generating a match score based upon the matching, the match score being based upon auxiliary alignment data comprising at least one of size of overlapping region, data quality, and content,
spoof attempt detecting based upon corresponding pairs of finger features and their spatial locations in the aligned enrollment and authentication data, and based upon the match score, and
an authentication decision based upon the matching and spoof detecting.

2. The finger sensor device according to claim 1 wherein said controller performs the spoof attempt detecting based upon at least one of spatial deformation distortion, relative error between corresponding finger features, and noise distortion.

3. The finger sensor device according to claim 2 wherein said controller performs spoof attempt detecting based upon non-linear deformation between corresponding enrollment and authentication finger features.

4. The finger sensor device according to claim 2 wherein the enrollment and authentication finger features comprise at least one of ridge-orientation angles, minutiae, and pores.

5. The finger sensor device according to claim 1 wherein said controller performs the aligning between corresponding enrollment and authentication finger features.

6. The finger sensor device according to claim 1 wherein said controller is for comparing the match score to a threshold for performing the spoof attempt detecting operation.

7. The finger sensor device according to claim 6 wherein the threshold is set based on a quality metric of the enrollment data.

8. The finger sensor device according to claim 1 wherein the controller is for generating a ratio of spoof likelihood based upon at least one of spatial deformation distortion, relative error between corresponding finger features, auxiliary alignment data, and noise distortion, and wherein determining the spoof attempt is based on the ratio.

9. The finger sensor device according to claim 1 wherein said controller comprises a memory cooperating with the finger sensing area for storing the enrollment data.

10. The finger sensor device according to claim 1 wherein said controller comprises a memory cooperating with the finger sensing area for storing the enrollment data.

11. A finger sensor device comprising:
a finger sensing area; and
a controller cooperating with said finger sensing area for storing enrollment data including finger feature locations and generating authentication data including finger feature locations based upon positioning of an object adjacent said finger sensing area;
said controller also for performing
aligning corresponding finger feature pairs in the authentication data and the enrollment data,
matching between the aligned enrollment and authentication data,
generating a match score based upon the matching, the match score being based upon auxiliary alignment data comprising at least one of size of overlapping region, data quality, and content,
spoof attempt detecting based upon at least one of spatial deformation distortion, relative error between corresponding finger feature pairs, and noise distortion, and their spatial locations in the aligned enrollment and authentication data, and based upon the match score, and
an authentication decision based upon the matching and spoof detecting.

12. The finger sensor device according to claim 11 wherein said controller performs spoof attempt detecting based upon non-linear deformation between corresponding enrollment and authentication finger features.

13. The finger sensor device according to claim 12 wherein the enrollment and authentication finger features comprise at least one of ridge-orientation angles, minutiae, and pores.

14. The finger sensor device according to claim 11 wherein said controller performs spoof attempt detecting also based upon the auxiliary alignment data.

15. A method of determining a spoof attempt in a finger sensor device comprising a finger sensing area and a controller cooperating with the finger sensing area for storing enrollment data and generating authentication data based upon positioning of an object adjacent the finger sensing area, the method comprising:
using the controller for performing
aligning the authentication data and the enrollment data,
matching between the aligned authentication data and enrollment data,
generating a match score based upon the matching, the match score being based upon auxiliary alignment data comprising at least one of size of overlapping region, data quality, and content,
spoof attempt detecting based upon corresponding pairs of finger features and their spatial locations in the aligned enrollment and authentication data, and based upon the match score, and an authentication decision based upon the matching and spoof attempt detecting.

16. The method according to claim 15 wherein using the controller for performing spoof attempt detecting comprises using the controller for performing the spoof attempt detecting based upon at least one of spatial deformation distortion, relative error between corresponding finger features, and noise distortion.

17. The method according to claim 16 wherein using the controller for performing spoof attempt detecting comprises using the controller for performing the spoof attempt detecting based upon non-linear deformation between corresponding enrollment and authentication finger features.

18. The method according to claim 16 wherein the enrollment and authentication finger features comprise at least one of ridge-orientation angles, minutiae, and pores.

19. The method according to claim 15 wherein using the controller for performing aligning the authentication data and the enrollment data comprises using the controller for performing the aligning between corresponding enrollment and authentication finger features.

20. A finger sensor device comprising:
a finger sensing area; and
a controller cooperating with said finger sensing area for storing enrollment data including finger feature locations and generating authentication data including finger feature locations based upon positioning of an object adjacent said finger sensing area;
said controller also for performing
aligning the authentication data and the enrollment data,
matching between the aligned enrollment and authentication data,
spoof attempt detecting based upon corresponding pairs of finger features and their spatial locations in the aligned enrollment and authentication data, the spoof attempt detecting being based upon auxiliary alignment data comprising at least one of size of overlapping region, data quality, and content, and
an authentication decision based upon the matching and spoof detecting.

21. The finger sensor device according to claim 20 wherein said controller performs the spoof attempt detecting based upon at least one of spatial deformation distortion, relative error between corresponding finger features, and noise distortion.

22. The finger sensor device according to claim 21 wherein said controller performs spoof attempt detecting based upon non-linear deformation between corresponding enrollment and authentication finger features.

23. The finger sensor device according to claim 21 wherein the enrollment and authentication finger features comprise at least one of ridge-orientation angles, minutiae, and pores.

24. The finger sensor device according to claim 20 wherein said controller performs the aligning between corresponding enrollment and authentication finger features.

25. The finger sensor device according to claim 20 wherein the controller is for generating a ratio of spoof likelihood based upon at least one of spatial deformation distortion, relative error between corresponding finger features, auxiliary alignment data, and noise distortion, and wherein determining the spoof attempt is based on the ratio.

26. A finger sensor device comprising:
a finger sensing area; and
a controller cooperating with said finger sensing area for storing enrollment data including finger feature locations and generating authentication data including finger feature locations based upon positioning of an object adjacent said finger sensing area;
said controller also for performing
aligning the authentication data and the enrollment data,
matching between the aligned enrollment and authentication data,
generating a match score based upon the matching,
spoof attempt detecting based upon corresponding pairs of finger features and their spatial locations in the aligned enrollment and authentication data, and based upon a comparison of the match score to a threshold, the threshold being set based upon a quality metric of the enrollment data, and
an authentication decision based upon the matching and spoof detecting.

27. The finger sensor device according to claim 26 wherein said controller performs the spoof attempt detecting based upon at least one of spatial deformation distortion, relative error between corresponding finger features, and noise distortion.

28. The finger sensor device according to claim 27 wherein said controller performs spoof attempt detecting based upon non-linear deformation between corresponding enrollment and authentication finger features.

29. The finger sensor device according to claim 27 wherein the enrollment and authentication finger features comprise at least one of ridge-orientation angles, minutiae, and pores.

30. The finger sensor device according to claim 26 wherein said controller performs the aligning between corresponding enrollment and authentication finger features.

31. The finger sensor device according to claim 26 wherein the controller is for generating a ratio of spoof likelihood based upon at least one of spatial deformation distortion, relative error between corresponding finger features, auxiliary alignment data, and noise distortion, and wherein determining the spoof attempt is based on the ratio.

32. A method of determining a spoof attempt in a finger sensor device comprising a finger sensing area and a controller cooperating with the finger sensing area for storing enrollment data and generating authentication data based upon positioning of an object adjacent the finger sensing area, the method comprising:
using the controller for performing
aligning the authentication data and the enrollment data,
matching between the aligned authentication data and enrollment data, and
spoof attempt detecting based upon corresponding pairs of finger features and their spatial locations in the aligned enrollment and authentication data, the spoof attempt detecting being based upon auxiliary alignment data comprising at least one of size of overlapping region, data quality, and content, and
an authentication decision based upon the matching and spoof attempt detecting.

33. The method according to claim 32 wherein using the controller for performing spoof attempt detecting comprises using the controller for performing the spoof attempt detecting based upon at least one of spatial deformation distortion, relative error between corresponding finger features, and noise distortion.

34. The method according to claim 33 wherein using the controller for performing spoof attempt detecting comprises using the controller for performing the spoof attempt detecting based upon non-linear deformation between corresponding enrollment and authentication finger features.

35. The method according to claim 33 wherein the enrollment and authentication finger features comprise at least one of ridge-orientation angles, minutiae, and pores.

36. The method according to claim 32 wherein using the controller for performing aligning the authentication data and the enrollment data comprises using the controller for performing the aligning between corresponding enrollment and authentication finger features.

* * * * *

UNITED STATES PATENT AND TRADEMARK OFFICE
CERTIFICATE OF CORRECTION

| | |
|---|---|
| PATENT NO. | : 8,275,178 B2 |
| APPLICATION NO. | : 12/486978 |
| DATED | : September 25, 2012 |
| INVENTOR(S) | : Boshra |

It is certified that error appears in the above-identified patent and that said Letters Patent is hereby corrected as shown below:

In the Claims:

| | |
|---|---|
| Column 10, Line 13, | Delete: "claim 1" |
| Claim 10 | Insert: --claim 20-- |

Signed and Sealed this
Thirtieth Day of April, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,275,178 B2 | Page 1 of 1 |
| APPLICATION NO. | : 12/486978 | |
| DATED | : September 25, 2012 | |
| INVENTOR(S) | : Michael Boshra | |

It is certified that error appears in the above-identified patent and that said Letters Patent is hereby corrected as shown below:

This certificate supersedes the Certificate of Correction issued April 30, 2013. The certificate is vacated since dependency correction in claim 10 changes the scope of the claims. The patent is reinstated to its originally-issued form to read as follows:

Column 10, line 13 (Claim 10, line 1) --....according to claim 1 wherein.....--.

Signed and Sealed this
Fourth Day of June, 2013

Teresa Stanek Rea
*Acting Director of the United States Patent and Trademark Office*